United States Patent [19]

Korbel

[11] 4,335,914

[45] Jun. 22, 1982

[54] GRAPPLE PIVOT JOINT WITH SWING DAMPENER

[75] Inventor: Adrian C. Korbel, Dubuque, Iowa

[73] Assignee: Deere & Company, Moline, Ill.

[21] Appl. No.: 180,933

[22] Filed: Aug. 25, 1980

[51] Int. Cl.[3] .......... B66C 1/00; F16F 7/04

[52] U.S. Cl. .......... 294/86 R; 188/83

[58] Field of Search .......... 294/70, 82 R, 86 R, 294/88, 106; 37/183 R; 188/1 B, 83; 403/113, 120; 414/626, 732-735, 738-740

[56] References Cited

U.S. PATENT DOCUMENTS

| | | | |
|---|---|---|---|
| 1,828,425 | 10/1931 | Matthews | 188/83 X |
| 3,219,162 | 11/1965 | Hainer et al. | 188/83 X |
| 3,301,587 | 1/1967 | Heikkinen | 294/82 R X |
| 3,889,829 | 6/1975 | Dutton | 414/732 |
| 3,937,302 | 2/1976 | Palmcrantz | 188/1 B |
| 4,099,761 | 7/1978 | Cullings | 294/86 R |

OTHER PUBLICATIONS

ESCO Corporation advertising brochure, "Model 26 Grapple," Jun. 9, 1975.

ESCO Corporation Catalog 275, Supplement 1, "Model 26 Fixed Boom Skidding Grapple," May 1978.

*Primary Examiner*—Johnny D. Cherry

[57] ABSTRACT

A suspension for a grapple includes a swivel link coupled between a support boom and a head of the grapple for permitting the latter to undergo swinging movement about first and second pivot axes arranged crosswise to each other. At each pivot axis, there is a pivot pin having a brake associated therewith and including a brake housing enclosing an outer end portion of the pin and containing brake disks and a Belleville spring for maintaining the disks frictionally engaged with each other.

9 Claims, 3 Drawing Figures

GRAPPLE PIVOT JOINT WITH SWING DAMPENER

BACKGROUND OF THE INVENTION

The present invention relates to forestry grapples and more specifically relates to pivot joint structures for suspending grapples from support booms.

It is known to suspend grapples from support booms by means of pivot joint structures which permit the grapple to swing about separate horizontal axes located crosswise to each other. One problem with such suspensions is that when the vehicle carrying the grapple is operated over rough terrain while the grapple is empty the grapple flops wildly about these axes and sometimes comes into contact with the support boom or other vehicle structure which may result in damage to the grapple, boom and/or other structure.

To overcome the problem of grapple flop, it is known in the prior art to provide grapple pivot structures with various types of friction brakes which inhibit such flop. These friction brakes suffer from one or more of the drawbacks of requiring frequent adjustment, of requiring the joint structure to be disassembled for servicing brake parts, of lacking flexibility for modifications for changing braking capacity, and of having the braking surfaces arranged such that dirt, lubricants and other foreign substances come into contact therewith and diminish the life and/or effectiveness thereof.

SUMMARY OF THE INVENTION

According to the present invention, there is provided an improved braking means embodied in a grapple pivot joint structure.

A broad object of the invention is to provide a grapple pivot joint structure which embodies a brake constructed so as to overcome the aforementioned drawbacks of the prior art.

More specifically, it is an object of the invention to provide a grapple pivot structure including brakes having friction elements located in housings at the outer ends of the pivot pins of the axes so as to be replaceable without disassembling the pins.

Another object of the invention is to provide a grapple pivot pin structure including lubricated bearings and having a brake isolated from the lubricant applied to the bearings.

These and other objects will become apparent from a reading of the description together with the appended drawings.

DESCRIPTION OF THE PREFERRED EMBODIMENT

Figure 1:
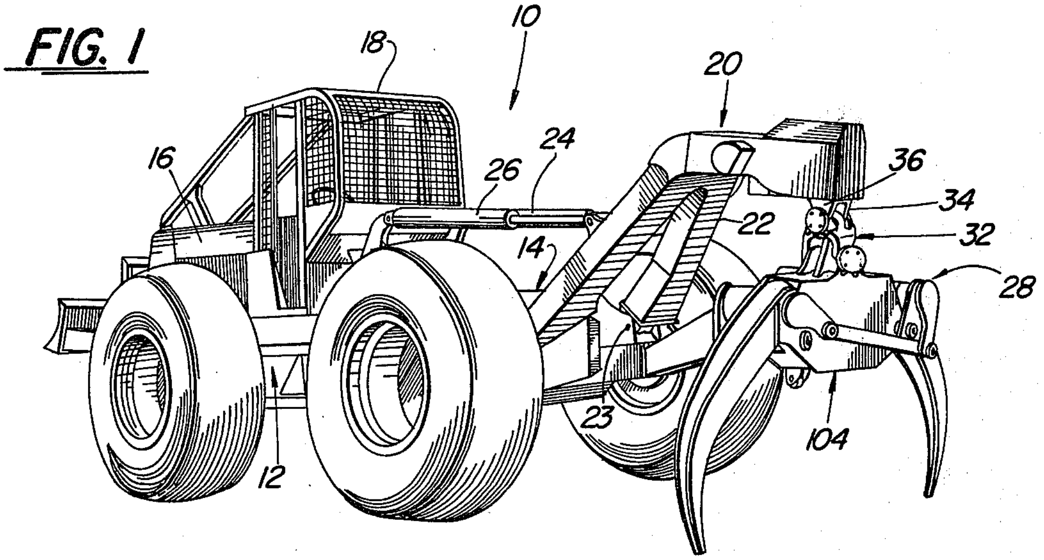
FIG. 1 is a left rear perspective view of a forestry grapple skidder having a grapple suspended from a boom by a pivot joint structure embodying friction brakes constructed in accordance with the principles of the present invention.

Referring now to FIG. 1, therein is shown a grapple skidder 10 including front and rear wheel-supported frame sections 12 and 14, respectively interconnected by a vertical pivot assembly (not shown). The front frame section carries an engine enclosed at 16 and an operator's station with attendant controls at a location 18 rearwardly of the enclosed engine.

The rear frame section has a grapple structure 20 mounted thereon. Specifically, the grapple structure 20 includes an inverted Y-shaped support boom 22 having an inner or lower end defined by a pair of transversely spaced legs connected to the frame section 14, as at 23, (only right side visible) for swinging vertically about a horizontal transverse axis. Hydraulic actuators 24 and 26 are connected between the frame section 14 and the boom 22 for controlling the vertical movement of the latter. A grapple 28 is suspended from the upper or outer end of the boom 22 by a suspension 32 which incorporates the present invention.

Figure 2:
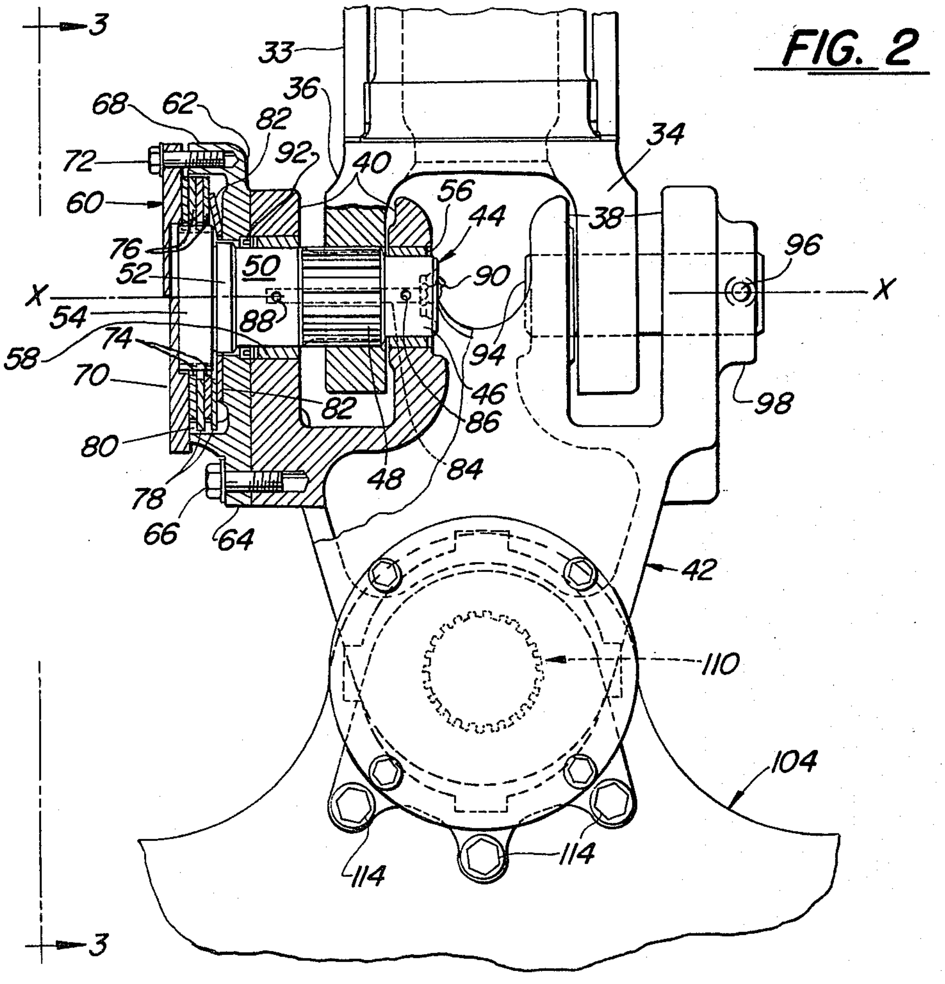
FIG. 2 is a side elevational view of the grapple suspension taken along a first pivot axis and having a portion of the pivot joint structure of the second pivot shown in vertical section so as to show the interior of one of the brakes, the upper and lower halves of the section respectively illustrating the brake housing access plate in a loosened and fully installed position.
Figure 3:
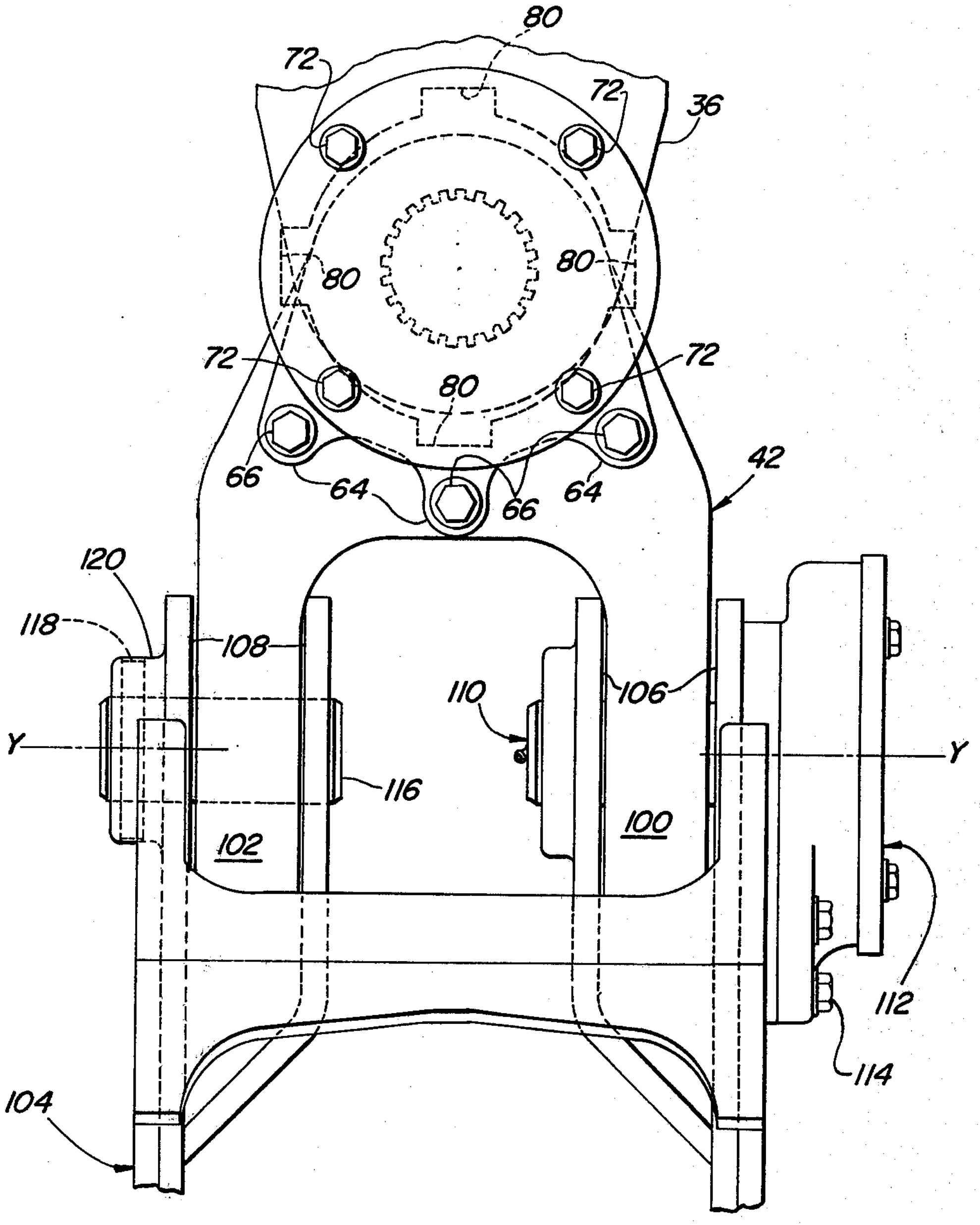
FIG. 3 is a side elevational view taken of the grapple suspension taken along the second pivot.

As can best be seen in FIGS. 2 and 3, the boom 30 carries an upright shaft 33 having a pair of transversely spaced depending lugs 34 and 36 at its lower end and respectively located between upwardly projecting lugs 38 and lugs 40, the lugs 38 and 40 forming part of a swivel link 42. Each of the lugs 34, 36, 38 and 40 is provided with a bore and these bores are arranged in alignment with each other along a first horizontal axis X—X.

Located in the bore means defined by the bores in the lug 36 and the set of lugs 40 is a pivot pin 44, which forms part of a friction brake. The pivot pin 44 has a series of sections, which increase in diameter from the inner to the outer end of the pin. Specifically, the pin 44 includes an inner bearing section 46 followed by a splined mounting section 48, an outer bearing section 50, a narrow section 52 and a splined outer section 54. The inner and outer bearing sections 46 and 50 are respectively received in bushings 56 and 58 pressed into the bores of the set of lugs 40 while the splined mounting section 48 is received in and engaged with splines provided in the bore of the lug 36. A brake housing 60 encloses the narrow and splined outer sections 52 and 54 and includes an inner plate 62 provided with a bore in which the narrow and outer bearing portions of the pin 44 are partly received. The plate 62 further includes three ears, indicated collectively at 64, spaced equidistant from and equiangularly about the pivot pin 44 at a location below the pin and secured to the swivel link 42 by three capscrews 66 received in respective bores provided in the ears 64. The plate 62 additionally includes an annular outwardly projecting rim 68 disposed coaxially with the pin 44 and the brake housing 60 includes an access or cover plate 70 engaged with the outer end of the pin 44 and releasably secured to the rim 68 by a set of four cap screws 72. Thus, it will be appreciated that inasmuch as the housing 60 is held in place by the cap screws 64 and the access plate 70 is against the outer end of the pin 44, the latter is held in place by the housing.

Located within the housing 60 is a stack of brake disks including a first pair of disks 74 having friction material fixed to opposite faces thereof and a second pair of disks 76 which serve as pressure plates. The disks 74 have splined central openings engaged with the splines on the splined outer section 54 of the pin 44 so as to be axially shiftable along but no rotatable about the pin. The disks 76 are each provided with four equiangularly spaced protuburances 78 (only one shown) about their periphery and these protuberances are respectively received in four equispaced pockets 80 formed in the rim 68 of the housing so as to be axially shiftable but not rotatable within the housing 60. It is noted that one of the disks 74 is located between the housing access plate 70 and one of the disks 76. Mounted on the narrow section 52 is a Belleville spring 82, which, when unloaded as shown in the top half of the section illustrated in FIG. 2, is dished outwardly so that its inner periphery engages the plate 62 of the housing 60 and its outer periphery engages the inner one of the pair of disks 76. When the cap screws 72 are tightened, the Belleville spring 82 is deflected so as to become sandwiched flat between the plate 62 and the disc 76 so as to maintain the stack of brake disks 74 and 76 in biased engagement with each other to thereby maintain a constant braking action resisting swinging movement of the swivel joint 42 about the axis X—X. While the narrow section 52 could be located outwardly of the splined section 54 of the pin 44 with the Belleville spring 82 then being mounted between the access cover 70 and the stack of brake disks, the illustrated embodiment is preferred since the Belleville spring 82 is then positioned and the stack of disks arranged so as to prevent the inner one of the stack of brake disks from falling off the splined section 54 of the pin during assembly.

A lubricant passage 84 is located in the pin 44 and includes two sets of radial openings 86 and 88, which respectively convey lubricant to the bushings 56 and 58. A grease fitting 90 at the inner end of the pin 44 is screwed into an axial portion of the passage 84. Located on the outer bearing section 50 of the pin 44 just outwardly of the bushing 58 is a seal 92, which serves to prevent lubricant from entering the brake housing 60.

The mounting of the swivel joint 42 to the shaft 33 is completed by a pivot pin 94, which is received in a bore means located on the axis X—X and defined by bores provided in the lug 34 and set of lugs 38. The pivot pin 94 is held in place by a retaining pin 96 which extends through a drilled passage provided in a boss 98 formed integrally with the outer one of the set of lugs 38 and a cross passage provided in an outer portion of the pin 94.

It is to be understood that in cases where additional braking capacity is required, the right side of the swivel joint (FIG. 2) may be modified and a brake assembly of the sort described hereinabove may be used to join the right side of the swivel joint to the shaft 33.

The lower end of the swivel joint 42 is defined, as viewed in FIG. 3, by right- and left-hand lugs 100 and 102. The grapple 28 includes a head or tong support frame 104 defining a right pair of lugs indicated at 106 and having the lug 100 disposed therebetween and a left pair of lugs indicated at 108 and having the lug 102 disposed therebetween. The lugs 100, 102, 106 and 108 are provided with axially aligned bores arranged along an axis Y—Y disposed crosswise to the axis X—X. Located in the bore means defined by the bores in the lugs 100 and 106 is a pivot pin 110, which is similar to construction and mounted similarly to the pin 44 described hereinabove. The pin 110 has a right end portion (not shown) enclosed by a brake housing 112, which is secured to the grapple head 104 by cap screws 114. Enclosed by the housing 112 are two sets of brake disks (not shown), which are respectively constructed similarly to the sets of disks 74 and 76 described above and are respectively non-rotatably connected to the pin 110 and housing 112.

The bore means defined by the bores in the lugs 102 and 108 have a pivot pin 116 received therein and held in place by a locking pin 118 received in a cross bore in the left end portion of the pin and in a bore provided in a boss 120 formed integrally with the outer one of the set of lugs 108.

The operation of the grapple suspension is as follows. During transport of the grapple skidder 10 in the forest, when the grapple 28 is unloaded as shown in FIG. 1, the tires in following uneven terrain and in passing over obstacles such as logs and boulders will create motion in the rear frame section 14 which will tend to effect swinging of the grapple about the axes X—X and Y—Y. Motion about the axis X—X is frictionally resisted by the stack of brake disks 74 and 76 which are loaded into engagement with each other by the Belleville spring 82 so that motion which does occur is very slow. Motion about the axis Y—Y is similarly frictionally resisted. The frictional resistance to motion about the axis of X—X and Y—Y may be changed, as desired, by varying the order and number of disks 74 and 76 to provide different combinations of friction surfaces.

In the event that the motion about the axes X—X and Y—Y is not sufficiently restrained by a given pivot pin and associated brake structure, a pivot pin having a longer outer splined end portion may be used along with additional disks 74 and 76 for added capacity. Of course a completely new housing 60 or at least a different cover 70 would then have to be provided to accommodate the longer splined end section of the pivot pin.

Another way of providing additional braking capacity would be to provide a suspension wherein the pin 94 on the axis X—X and the pin 116 on the axis Y—Y are respectively replaced by a pivot pin and associated friction brake constructed similarly to the pins 44 and 110 and their associated friction brakes.

In the event that the brake disks of the grapple suspension 32 should become worn to the extent that adequate braking no longer occurs, the disks may be easily replaced without necessitating the removal of the pins 44 or 110. For example, with reference to FIG. 2, it can be seen that the disks 74 and 76 may be replaced by merely removing the access cover 70 and taking out the worn disks 74 and 76. New disks 74 and 76 may then be installed in place and the cover 70 reinstalled. As the screws 72 are being tightened to move the cover 70 from its loose position shown in the top half to its closed position shown in the bottom half of the illustration, the Belleville spring 82 moves from its illustrated uncompressed to its fully compressed position. Thus, once the cover 70 is properly installed the spring 82 will be properly compressed.

I claim:

1. A pivot joint assembly incorporating a friction brake, comprising: first and second members respectively defining first and second axially aligned bores; a pivot pin received in the first and second bores; first means securing the pivot pin to the first member; said second member being rotatably received on the pin; said pin including an end portion located outside the first and second bores; a housing encompassing said end portion and being fixed solely to the second member; a friction brake located in said housing and including at least one pressure plate non-rotatably and axially shiftably mounted on the pin and a friction plate non-rotatably mounted in the housing; and a Belleville spring compressed between the housing and the pressure plate.

2. The pivot joint assembly defined in claim 1 wherein the housing includes a cover plate located in axial alignment with the pin and the friction brake and being releasably secured to the remainder of the housing, said friction brake being sandwiched between the Belleville washer and the cover plate and compressively loaded by the Belleville washer when the cover plate is installed.

3. The pivot joint assembly defined in claim 1 wherein the first means securing the pivot pin to the first member comprises mating splined portions respectively located in the first bore and on the pivot pin.

4. The pivot joint assembly defined in claim 1 wherein the second member includes a pair of lugs provided respectively with a pair of bore portions which define the second bore and the first member includes a lug disposed between the pair of lugs and having the first bore located therein in axial alignment with the aligned bore portions; a pair of bushings respectively being press fit in the pair of bore portions; said pivot pin having a pair of bearing surfaces respectively pivotally received in the pair of bushings; a lubrication passage means being provided in the pivot pin and leading to the pair of bushings; and a lubricant seal mounted on the pin between the bushings and the friction brake so as to isolate the latter from lubricant used to lubricate the bushings.

5. In a grapple suspension including a swivel link respectively pivotally connected to a support boom and a grapple head by first and second pivot pin means arranged crosswise to each other so as to define first and second pivot axes, an improved friction brake, comprising: said first and second pivot pin means respectively being non-rotatably fixed to the support boom and to the swivel link; the first pivot pin means including an end portion located beside the swivel link; a first brake disk non-rotatably mounted on the end portion of the first pivot pin means; a brake housing enclosing the end portion of the first pivot pin means and integrally fixed to the swivel link; a second brake disk located in the brake housing and non-rotatably mounted thereto in a location adjacent the first brake disk; and a Belleville spring located in the brake housing and compressed between a wall of the latter and one of the first and second brake disks.

6. The grapple suspension defined in claim 5 wherein the support boom includes a downwardly projecting lug provided with a splined bore arranged along the first axis and the swivel link includes first and second upwardly projecting lugs respectively provided with first and second bores arranged along the first axis; said first pivot pin means including a first pivot pin having first and second bearing portions received in the first and second bores and a first splined portion received in the splined bore; said end portion of the pivot pin being considerably larger in diameter than the remainder thereof and being defined by a second splined portion; and said first brake disk having splines received on the second splined portion.

7. The grapple suspension defined in claim 6 wherein said first pivot pin is provided with a lubricant passage leading to the first and second bearing portions thereof; and a lubricant seal being located on the first pin between the brake housing and an adjacent one of the bearing portions.

8. The grapple suspension defined in claim 6 wherein the first pivot pin includes an annular surface portion located between the second splined portion and an adjacent one of the first and second bearing portions, the annular surface portion being smaller in diameter than the second splined portion and being located at least partly within the housing; and said Belleville spring being received on the annular surface.

9. The grapple suspension defined in claim 8 wherein the brake housing includes a removable access cover located at that end of the first pivot pin defined by the second splined portion and extending axially so as to have the second splined portion received partly therein by a predetermined axial amount when the cover is installed; said predetermined axial amount being at least equivalent to an axial deflection of the Belleville spring required to move the latter between free and fully compressed conditions; and said first and second brake disks being held in engagement with each other and the Belleville spring being fully compressed when the cover is installed and the disks are in an unworn condition.

* * * * *